United States Patent

Kaneko et al.

[11] Patent Number: 5,970,711
[45] Date of Patent: Oct. 26, 1999

[54] MASTER CYLINDER HAVING DOUBLE STRUCTURED SEAL RING

[75] Inventors: Takeshi Kaneko; Yutaka Kawabe; Katsumi Maehara; Takaaki Ohnishi, all of Yokosuka, Japan

[73] Assignee: Nabco Limited, Hyogo-ken, Japan

[21] Appl. No.: 08/969,809

[22] Filed: Nov. 13, 1997

[51] Int. Cl.[6] .................................................. B60T 11/236
[52] U.S. Cl. ............................................... 60/588; 60/562
[58] Field of Search ....................................... 60/588, 562

[56] References Cited

U.S. PATENT DOCUMENTS 5,168,791   12/1992   Maehara et al. ........................... 60/588
5,715,681   2/1998    Williamson ................................ 60/588

*Primary Examiner*—Sheldon J. Richter
*Attorney, Agent, or Firm*—Kane, Dalsimer, Sullivan, Kurucz, Levy, Eisele and Richard, LLP

[57] ABSTRACT

A main object of the present invention is to provide a technique capable of improving the assembling performance of a double seal ring. According to the first embodiment of the invention, on the piston 31 side to which a seal ring is attached, there are provided a ring retaining portion 300 having an outside diameter L0 and for retaining a double seal ring 51, a first land portion 310 adjacent to the ring retaining portion 300 and having an outside diameter L1 (where L1>L0), and a second land portion 320 adjacent to an opposite side of the ring retaining portion 300 to the first land portion 310 and having an outside diameter L2 (where L2<L1). The outside diameter L2 of the second land portion 320 is set to be equal to or smaller than an inside diameter of the outer peripheral resin ring 55, and one side surface of the outer peripheral resin ring 55 on the side of the second land portion 320 is supported by a retainer ring 80 retained by the piston 31. According to the second embodiment of the invention, the piston 32 itself is provided with a tapered portion 280 having a function as an attachment tool. The tapered portion 280 is gradually enlarged in outside diameter from the insert end portion X for attaching the seal ring towards the attachment groove 2300. The outside diameter of the tapered portion 280 at the insert end portion X is set to be smaller than the inside diameter of the resin ring 55.

22 Claims, 11 Drawing Sheets

MASTER CYLINDER HAVING DOUBLE STRUCTURED SEAL RING

BACKGROUND OF THE INVENTION

This invention relates to a master cylinder whose seal means for sealing the outer periphery of a piston is a double structured seal ring (namely, a double seal ring) including an inner peripheral seal ring and an outer peripheral seal ring situated on the outer periphery of the internal seal ring. In other words, this invention relates to a technique which can broadly be applied to a master cylinder used for a brake or a clutch, and more specifically to a master cylinder, in which an opening portion of a relief port formed in a cylinder body is blocked or interrupted by a seal ring in accordance with motion of the piston. More particularly, this invention relates to a technique suited to be applied to a tandem type master cylinder used for an anti-skid brake system.

The idea itself, for sealing the outer periphery of a piston with a double seal ring consisting of an inner peripheral seal ring and an outer peripheral seal ring is previously known. For example, Japanese Patent Laid-Open Publication No. 219263/1994 or U.S. Pat. No. 5,168,791 showing a hydraulic pressure type booster device, discloses a technique, in which, in order to seal the outer periphery of the servo piston, an O-ring and a resin ring are fitted in a groove formed in the outer periphery of the servo piston, the former on the inner periphery side and the latter on the outer periphery side. The inner peripheral seal ring made of rubber or the like is for sealing a space between the piston and the cylinder body, and a space between the outer peripheral seal ring and the cylinder body under the effect of its own elastic deformation. Moreover, the outer peripheral seal ring is subjected to an elastic force of the inner peripheral seal ring to seal a space between the inner periphery of the cylinder body and the piston. Since the outer peripheral seal ring is smaller in sliding resistance than the inner peripheral O-ring made of rubber, a smooth movement of the moving piston is facilitated.

Paying attention to the fact that the double seal ring is hardly susceptible to biting by seal (namely, a phenomenon in which the lip portion of the seal ring is bited and damaged by an opening of the relief port formed in the cylinder body), the present inventors recently proposed a technique in which the double seal ring is applied to a master cylinder. As one of such proposals, Japanese Patent Application No. 321190/1995 filed on Nov. 16, 1995 (laid open for public inspection on May 27, 1997) under 136639/1997) discloses a technique, in which a seal ring of a double seal ring structure is formed on an outer peripheral surface of a piston, a communication path for communicating a working fluid reservoir with a hydraulic pressure chamber is formed within a piston in order to supply a supplemental fluid to the hydraulic pressure chamber, and a supplementary valve is disposed on the communication path. Similarly, Japanese Patent Application No. 198487/1996 filed on Jul. 9, 1996 discloses another technique, in which a seal ring of a double seal ring structure is formed on the outer periphery of the piston, and a small piston is movably disposed within the piston, so that when the pressure in the hydraulic pressure chamber becomes negative and a pressure difference occurs between the atmospheric pressure on the side of the working fluid reservoir and the pressure in the hydraulic pressure chamber, the small piston is caused to move by this pressure difference, thus reducing the capacity of the hydraulic pressure chamber. A capacity reducing means including the small piston and a supplementary means including the supplementary valve are for supplementing a cup type seal ring having no supplementary feeding function.

By the way, in those preceding techniques, either well known or not, a groove for the seal ring to be fitted therein is formed in the outer periphery of the piston, and both the O-ring and the resin ring constituting the double sealing are arranged in the same groove with their enlarged diameter portions climbed over adjacent land portions of the piston. When the double seal ring is arranged in the groove formed in the outer periphery of the piston, the O-ring on the inner periphery is easily elastically deformed, and such deformed configuration of the inner peripheral O-ring is rapidly returned to its original configuration. However, the outer peripheral resin ring, which is harder than the O-ring, is difficult to be elastically deformed. Moreover, the outer peripheral resin ring, once deformed in configuration, is not easily returned to its original configuration. For this reason, a special tool is required for fitting the resin ring. Moreover, it is necessary to leave the resin ring as it is for quite a long time until the resin ring is restored to its original state. Even if returned to its original state, the resin ring, which is not easily elastically deformed, is not returned to its original state correctly in a strict sense. This can result in insufficient sealing performance and deteriorated sliding performance. In the conventional master cylinder using a cup type seal ring, the use of a return spring retainer as means for supporting the cup type seal ring is well known (U.S. Pat. No. 4,437,310).

Further, in the master cylinder including a double seal ring, aside from the problem pertaining to the assembly of such a resin ring, there is encountered with such an inconvenience that when the land portion of the piston is faced with an opening of a relief port on the side of the cylinder body immediately before the piston reaches its returned position, a space formed between the inner wall of the cylinder body and the land portion acts as a throttling for interrupting the return of the fluid towards the reservoir because of the following reason. In order to reliably support the double seal ring, or in order to maintain a mechanical strength of the piston in the vicinity of the attachment groove, an axial distance of the land portion adjacent the attachment groove must have a prescribed length. On the other hand, in order to reduce operating play (namely, invalid stroke), the end of the double seal ring is located as closer to the opening of the relief port as possible. In view of such a design concept, the land portion of the piston must be faced with the opening of the relief port, and thus, the afore-mentioned throttling is resulted.

SUMMARY OF THE INVENTION

It is, therefore, the first object of the present invention to provide a technique for enhancing the assembling performance of a double seal ring.

Another object of the present invention is to provide a technique capable of fitting an outer peripheral seal ring, which is made of hard material such as resin, or the like, to a piston without a need of enlarging the diameter of the outer peripheral seal ring.

A further object of the present invention is to provide a technique for enabling a double seal ring to exhibit excellent sealability and sliding performance after it is assembled.

A still further object of the present invention is to provide a technique capable of ensuring a smooth return of a fluid from a hydraulic pressure chamber towards a reservoir even when a piston is located immediately before the returned position, in a master cylinder including a double seal ring.

The first concern of the present invention is an idea that in view of a difference in easiness for elastically deforming both the inner and outer peripheral seal rings, the inner peripheral seal ring, which is easily elastically deformed, is attached to the piston while allowing the inner peripheral seal ring to be elastically deformed, but the outer peripheral seal ring, which is difficult to be elastically deformed, is attached to the piston without elastically deforming the outer peripheral seal ring.

Based on this first idea, according to the present invention, on the piston side, there are provided a ring retaining portion having an outside diameter L0 and for retaining a double seal ring, a first land portion adjacent to the ring retaining portion and having an outside diameter L1 (where L1>L0), and a second land portion adjacent to an opposite side of the ring retaining portion to the first land portion and having an outside diameter L2 (where L2<L1), the outside diameter L2 of the second land portion being equal to or smaller than an inside diameter of the outer peripheral seal ring, one side surface of the outer peripheral seal ring on the side of the second land portion being supported by a retainer ring retained by the piston. By setting the outside diameter L2 of the land portion of the piston to be equal to or smaller than an inside diameter of the outer peripheral seal ring, the outer peripheral seal ring can be attached to an outer periphery side of the inner peripheral seal ring of the ring retainer without radially expanding the outer peripheral seal ring.

Although both the inner and outer peripheral seal rings can be retained by providing a retainer member also to the other side surface of the piston on the side of the first land, the other side surface on the side of the first land portion is preferably supported by a side wall of the first land portion. On the other hand, with respect to the first-mentioned side surface on the side of the second land, not only the outer peripheral seal ring but also the inner peripheral seal ring can be supported by the retainer ring. In the alternative, it may be arranged such that only the side surface of the outer seal ring is supported by the retainer ring and the inner peripheral seal ring is supported by the side wall of the second land portion of the piston. When one side surfaces of both the inner and outer peripheral seal rings are retained by the retainer ring, the outside diameter L0 of the ring retaining portion is preferably set equal to the outside diameter L2 of the second land portion. In contrast, when only one side surface of the outer peripheral seal ring is supported by the retainer ring, a reduced diameter portion having the same diameter as the outside diameter of the second land portion is preferably provided on an area near the ring retaining portion of the first land portion. By doing so, the outer peripheral seal ring can be supported by both the second land portion and the reduced diameter portion. Thus, the outer peripheral seal ring can be supported in a more stable manner.

The second concern of the present invention is another idea that by providing a portion having a role for acting as a tool to the piston itself, the assembling performance of the double seal ring, particularly, of the outer peripheral ring, which is difficult to be deformed, can be enhanced.

The piston body includes an insert end portion serving as an insert port usable when the seal ring is assembled, and an attachment groove located on the axial line but away from the insert end portion to the other end side of the piston body. The double seal ring is fitted in the attachment groove in order to mutually seal the front and rear parts of the piston body in its axial direction. The double seal ring includes an inner peripheral real ring made of elastic material, and an outer peripheral seal ring made of harder material than the inner peripheral seal ring and located on the outer periphery of the inner peripheral seal ring. From a view to enhancing the assembling performance of the seal ring, the present invention has the following features A and B.

A. The outside diameter of the insert end portion of the piston body is smaller than the inside diameter of the outer peripheral seal ring, and the outside diameters of the first and second land portions adjacent to the attachment groove are larger than the inside diameter of the outer peripheral seal ring.

B. Between the insert end portion and the attachment groove of the piston body, there is provided a tapered portion which is gradually increased in outside diameter from the insert end portion to the attachment groove.

For example, when a piston having such features as mentioned above is assembled as a component part of a master cylinder, the insert end portion of the piston body corresponds to a portion facing with the hydraulic pressure chamber.

The first and second lands adjacent to the attachment groove may have the same outside diameter (outside diameter of that portion having the largest diameter). However, it is more preferred that the outside diameter of the second land portion located on the same side as the insert end portion to be served as the insert port is set to be smaller than the outside diameter of the first land portion on the opposite side. By doing so, the assembling of the outer peripheral seal ring can be performed easily. Although it is good enough if the tapered portion for enhancing the assembling performance is provided on at least a part of the area from the insert end portion to the attachment groove, most preferably, the tapered portion is provided over the entire area from the insert end portion to the attachment groove. By doing so, the assembling of the seal ring can be performed in the easiest manner. Although the double seal ring is less damaged, the double seal ring itself usual has no supplement fluid feeding function. For this reason, the master ring including the double seal ring is required to include a supplemental feed means including a supplemental valve, or a capacity reducing means including a small piston as disclosed in the afore-mentioned preceding application. The supplementary feed means or the capacity reducing means enables a supplemental feed of a fluid to the hydraulic pressure chamber, or reduces the capacity of the hydraulic pressure chamber, so that the piston can rapidly be returned to a non-actuation position even when the master cylinder is abruptly actuated.

Also, it is preferred that by changing the configuration of the land portions of the piston adjacent to the attachment groove, the throttling function in the vicinity of the opening of the relief port is eliminated. From the foregoing view point, the present invention has the following feature C.

C. The second land portion of the piston includes a tapered portion at an area facing with the opening of the relief port on the side of the cylinder body, and this tapered portion is gradually enlarged in outside diameter from the insert end portion of the piston body to the attachment groove.

Viewing as a piston of the master cylinder, the tapered portion of this feature C is the same as the tapered portion of the above-mentioned feature B. However, since the tapered portion of the feature C is designed to reduced the flowing resistance of the working fluid between the hydraulic pressure chamber and the relief port, this tapered portion is required to be faced with the opening of the relief port. In this respect, the tapered portion of the feature B includes those which do not face with the opening portion of the relief port. Therefore, a tapered portion facing with at least the opening of the relief port such as, for example, a tapered portion extending over the entire area from the insert end portion to the attachment groove of the piston body can fulfill the requirements of both the features B and C and are thus preferable.

Of the double seal ring, the inner peripheral seal ring is most preferably an O-ring made of elastic molecular elastomer based on ethylene propylene terpolymer, or ethylene propylene rubber. Those materials each have an anti-oil property against a non-petroleum brake oil for automobiles and a heat resisting property which can stand for such a high temperature as more than 120° C. On the other hand, the outer peripheral seal ring is preferably made of resin material, particularly preferably material having a small sliding resistance between the cylinder body and the outer peripheral seal ring, and more particularly preferably, ethylene tetra-fluoride resin (merchandise name: Teflon). The entire outer seal ring may also be made of the same material here. It is also accepted that the outer peripheral seal ring is made of other resin material or metal material inasmuch as the sliding surface is coated with a resin having a small sliding resistance.

Furthermore, the present invention can also be applied to either the single type or tandem type master cylinder. Particularly, it can be applied to a tandem type master cylinder for a brake in an anti-skid brake system with a significant effect.

BRIEF DESCRIPTION OF THE DRAWINGS

FIG. 6(A) is a sectional view similar to FIGS. 3 through 5, and FIG. 6(B) is a sectional view taken on line 6—6 of FIG. 6(A);

FIG. 7(A) is a sectional view, and FIG. 7(B) is a sectional view taken on line 7—7 of FIG. 7(A);

DETAILED DESCRIPTION OF THE PREFERRED EMBODIMENTS

Figure 1:
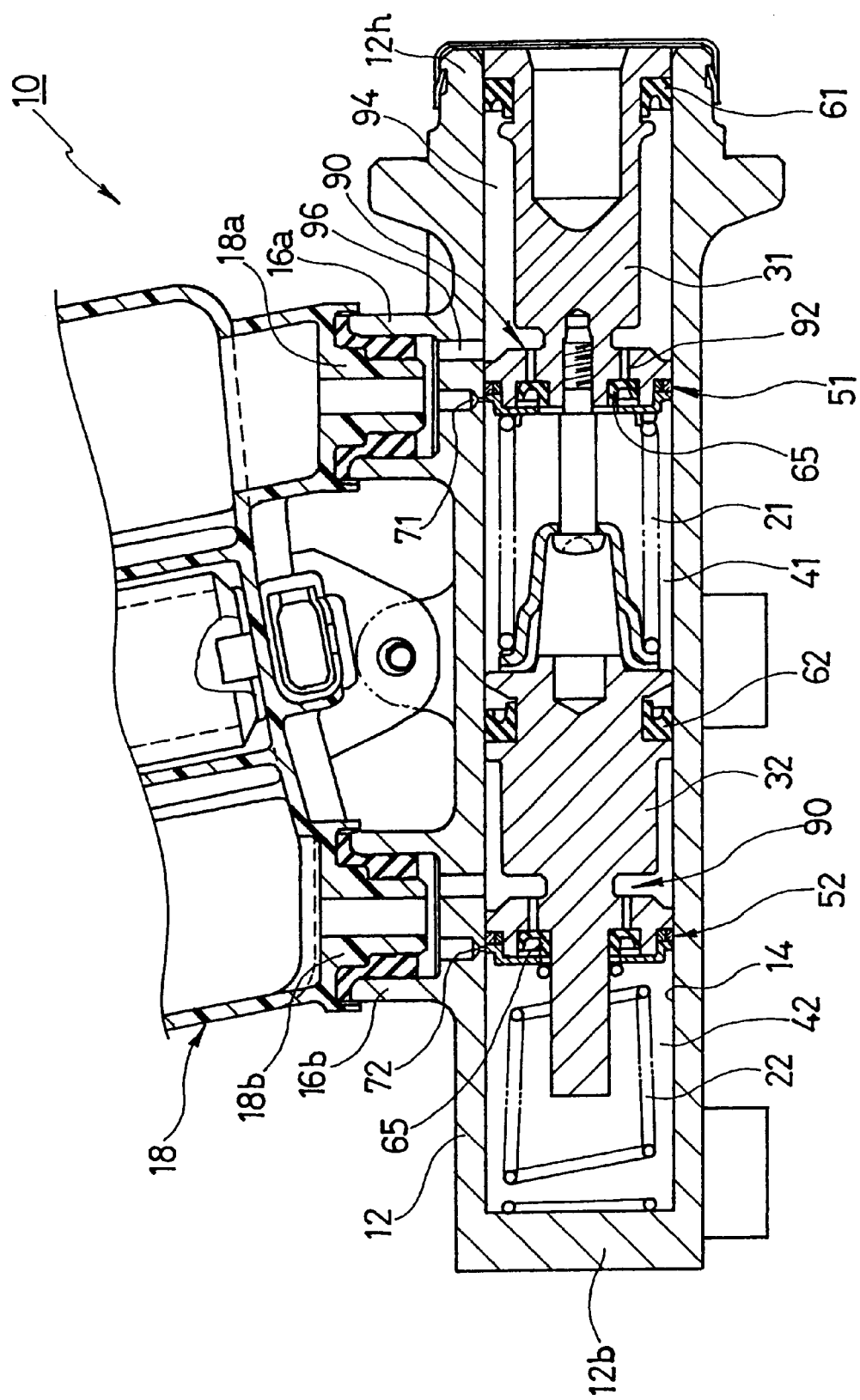
FIG. 1 is a sectional view showing an overall construction of one embodiment of a tandem type master cylinder according to the present invention.
Figure 2:
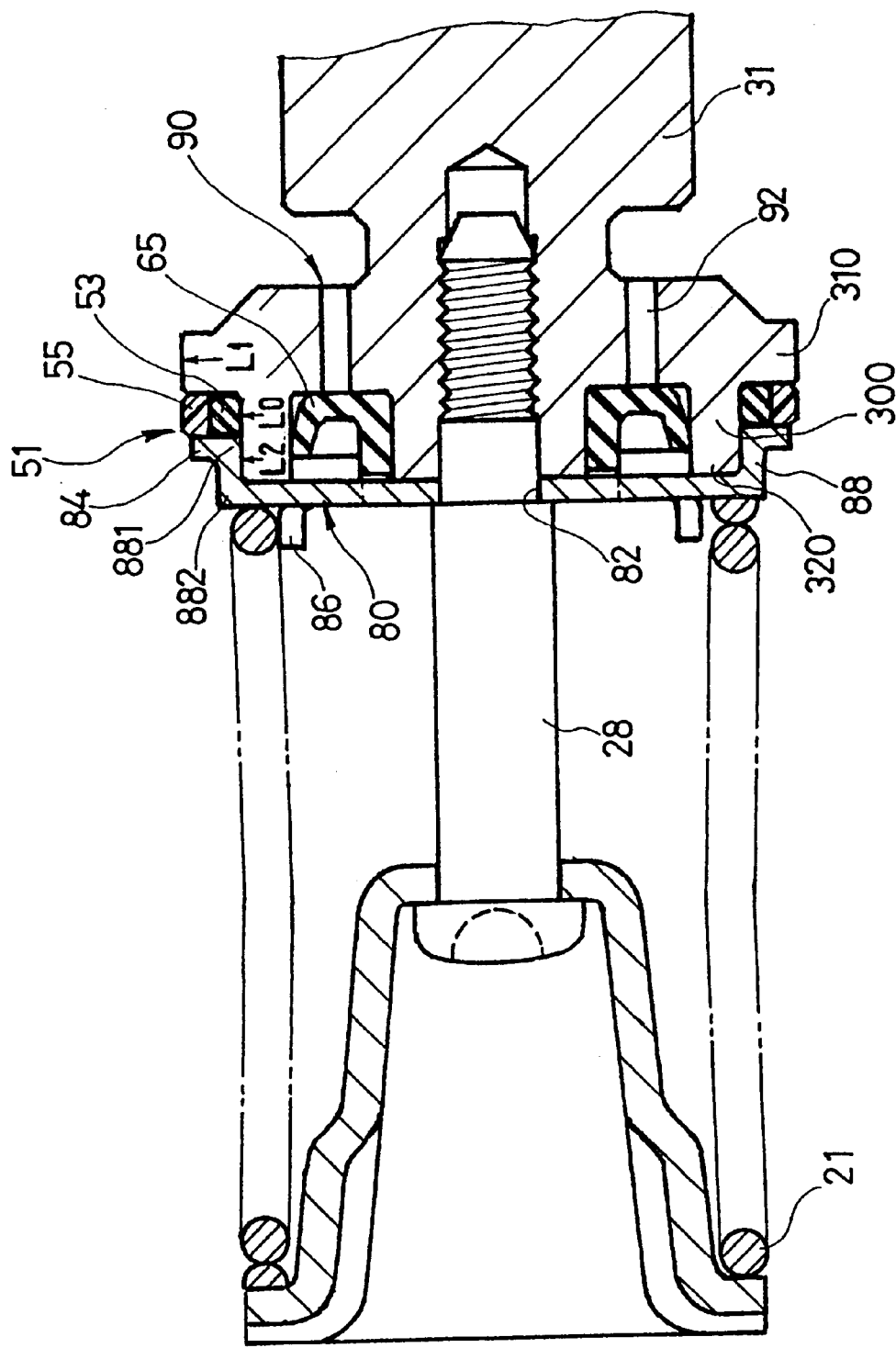
FIG. 2 is an enlarged sectional view showing a main portion of FIG. 1.

FIG. 1 shows an overall sectional construction of a tandem type master cylinder for use of a brake, to which the present invention is applied, and FIG. 2 is a partly enlarged view showing an end portion, and its nearby area, of a primary piston of the master cylinder.

A tandem type master cylinder 10 includes a cylinder body 12 having therein a cylinder bore 14 extending along an axis thereof. On an upper portion of the cylinder body 12, there are provided boss portions 16a, 16b which are in communication with the cylinder bore 14. A working fluid reservoir 18 is supported on the cylinder body 12 with its joint portions 18a, 18b inserted into the boss portions 16a, 16b, respectively. The cylinder bore 14 in the cylinder body 12 is closed on the side of a cylinder bottom 12b shown on the left-hand side of FIG. 1 and opened on the side of a cylinder head 12h shown on the right-hand side. The inner periphery of the cylinder bore 14 has a uniform diameter. Within the cylinder bore 14, there are a return spring 22, a secondary piston 32, another return spring 21, and a primary piston 31 which are arranged in order from the cylinder bottom 12b side towards the cylinder head 12h side.

The primary piston 31 and the secondary piston 32 are provided at two places of their outer peripheries with seal rings 51, 61; 52, 62, respectively. With respect to each of the pistons 31, 32, the seal rings 61, 62, among the seal rings supported by the pistons 31, 32, which are nearer to the cylinder head 12h side, are of a cup type, whereas the seal rings 51, 52 nearer to the cylinder bottom 12b side are double seal rings in question. Defined within the cylinder bore 14 by those seal rings 51, 61; 52, 62 are a second hydraulic pressure chamber 42 located in the innermost end and a first hydraulic pressure chamber 41 located between the pistons 32, 31. In a normal condition where no braking operation is made, the pistons 32 and 31 are biased towards the cylinder head 12h side by return springs 22, 21, respectively. Therefore, in the normal condition, the first and second hydraulic pressure chambers 41, 42 are in communication with the interior of the working fluid reservoir 18 through relief ports 71, 72 which are formed on the cylinder body 12 side. When an operator actuates the brake, first, the primary piston 31 overcomes the biasing force of the return spring 21, and then, in accordance with the motion on the primary side, the secondary piston 32 overcomes the biasing force of the return spring 22 and moves towards the cylinder bottom 12b side. Then, the double seal rings 51, 52 close the relief ports 71, 72, respectively. The pistons 31, 32 further progresses forwardly to generate hydraulic pressure within the first and second hydraulic pressure chambers 41, 42.

The master cylinder 10 according to one embodiment of the present invention employs a double sealing as the seal rings 51, 52 for opening and closing the relief ports 71, 72. The double sealing comprises an O-ring 53 located on the inner periphery side of the maser cylinder 10, and a resin ring located on the outer periphery side. As already mentioned, the double seal ring has, on the hand one, such an advantage that the seal is less damaged but, on the other hand, such a disadvantage that a requirement for a supplemental feed of fluid must be met. Here, the pistons 31, 32 are provided on end face portions thereof with cup type seal rings 65, respectively, so that working fluid can be fed from the working fluid reservoir 18 side to the hydraulic pressure chambers 41, 42. The pistons 31, 32 and their peripheries are provided respectively with communication paths 90 for communicating the hydraulic pressure chambers 41, 42 with the interior of the working fluid reservoir 18. One opening portions of the communication paths 90 are sealed by the cup type seal rings 65. Therefore, when negative pressure is generated within the hydraulic pressure chambers 41, 42 by abrupt braking operation or anti-skid controlling, a pressure difference occurs at a front and rear area of a lip of each cup type seal ring 65. Due to the effect of this pressure difference, the lip is caused to fall or collapse, so that working fluid is fed from the working fluid reservoir 18 side to the hydraulic pressure chambers 41, 42. The communication paths 90 each include a space 94 at the side periphery of each piston 31, 32 and a supplementary bore 96 formed in the cylinder body 12 in addition to the relief port 92 formed in each piston 31, 32.

In the first embodiment of the present invention, there is one feature in the supporting structure of the double seal rings 51, 52. This feature is common with both the primary side and the secondary side. As better seen from FIG. 2 showing the primary side on a partly enlarged scale, in the master cylinder 10, although the diameter of a first land portion 310 adjacent to a ring retaining portion 300 for retaining the double seal ring 51 (52) is large, the diameter of a second land portion 320 near the end face of the piston 31 (32) is the same as that of the ring retaining portion 300. That is, if the outside diameters of the ring retaining portion 300, the first land portion 310, and the second land portion 320 are represented by L0, L1, and L2, respectively, L2=L0 and also L0<L. The difference between L1 and L0 becomes equal to the thickness of the double seal ring 51 (52) attached to the master cylinder 10. In this way, since the diameter L2 of the second land portion 320 is the same as the diameter L0 of the ring retaining portion 300, not only the inner peripheral seal ring comprising the O-ring 53 but also the outer peripheral seal ring comprising the resin ring 55 can easily be attached to the ring retaining portion 300. Especially, since the outer peripheral resin ring 55 can be attached without any substantial elastic deformation, no waiting for restoration thereof is required. The double seal ring 51 (52) attached to the ring retaining portion 300 is supported at one side surface thereof by the side wall of the first land portion 310, and at the other side surface by a retainer ring 80.

The retainer ring 80 also serves as a spring retainer for one of the return springs 21 (22), and can also be retained on the end face portion of the piston 31 (32) by only the spring force of the return spring 21 (22). However, with respect to the primary side, the retainer ring 80 is fixed by means of tightening a bolt member 28 of a caged spring. The retainer ring 80 is processed by press molding. The retainer ring 80 includes a center bore 82 formed in a central portion thereof and receiving therein the bolt member 28, a flange portion 84 formed on the outer peripheral portion and for supporting the side surface of the double seal ring 51, and an upwardly press worked portion 86 formed on an intermediate portion thereof in a radial direction of the retainer ring 80. The upwardly press worked portion 66 has an upwardly press worked element which serves to assist the support of the return spring 21. A bore caused by the upwardly press working operation serves as a relief port to the hydraulic pressure chamber 41. An outside diameter of the flange portion 84 formed on the outer periphery of the retainer ring 80 is slightly smaller than the diameter of the first land portion 310 of the piston 31. Owing to this arrangement, since the outer peripheral surface of the flange portion 84 is not in contact with the inner peripheral wall of the cylinder body 12, this surface is not required to be accurately processed, for example, by mirror finish or the like. The retainer ring 80 includes two bent portions 881, 882 formed in an area near the flange portion 83. A sheet portion 88 for connecting the two bent portions 881, 882 together is in parallel with the axes of the piston 31 and the cylinder bore 14. The retainer ring 80 is supported by the piston 31 with the sheet portion 88 engaged with the second land portion 320. Therefore, the retainer ring 80 is firmly integrated with the piston 31 with the help of the bolt member 28 for tightly fixing the retainer ring 80 to the piston 31. For this reason, the function of the retainer ring 80 for supporting the side surface of the double seal ring 51 is very stable.

Other Supporting Example of Retainer Ring

Figure 3:
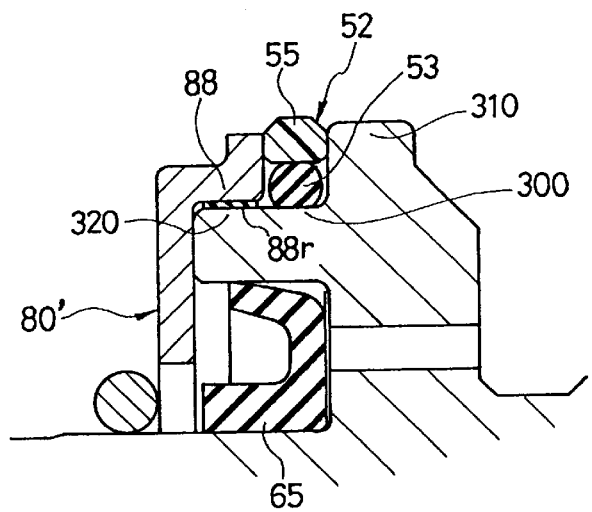
FIG. 3 is an enlarged sectional view of a main portion showing another supporting example of a retainer ring.
Figure 4:
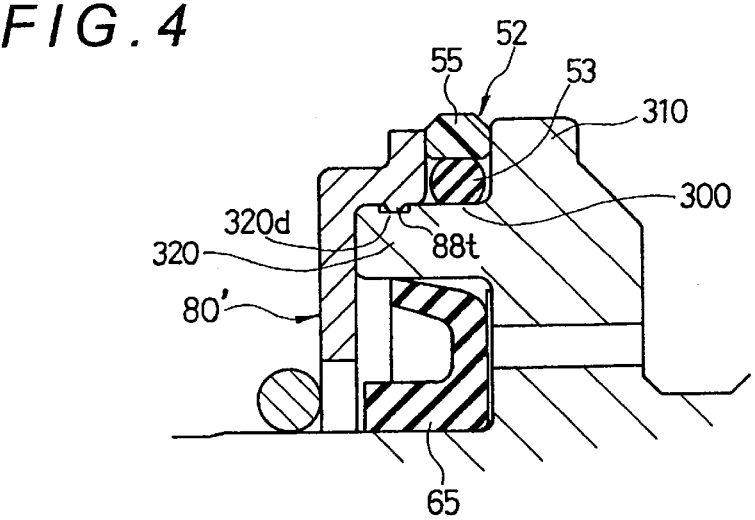
FIG. 4 is an enlarged sectional view of a main portion similar to FIG. 3.
Figure 5:
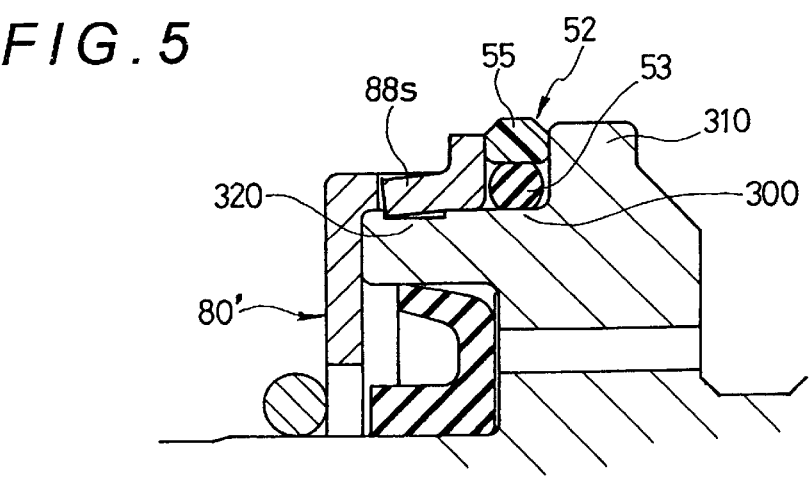
FIG. 5 is an enlarged sectional view of a main portion similar to FIGS. 3 and 4.
Figure 6:
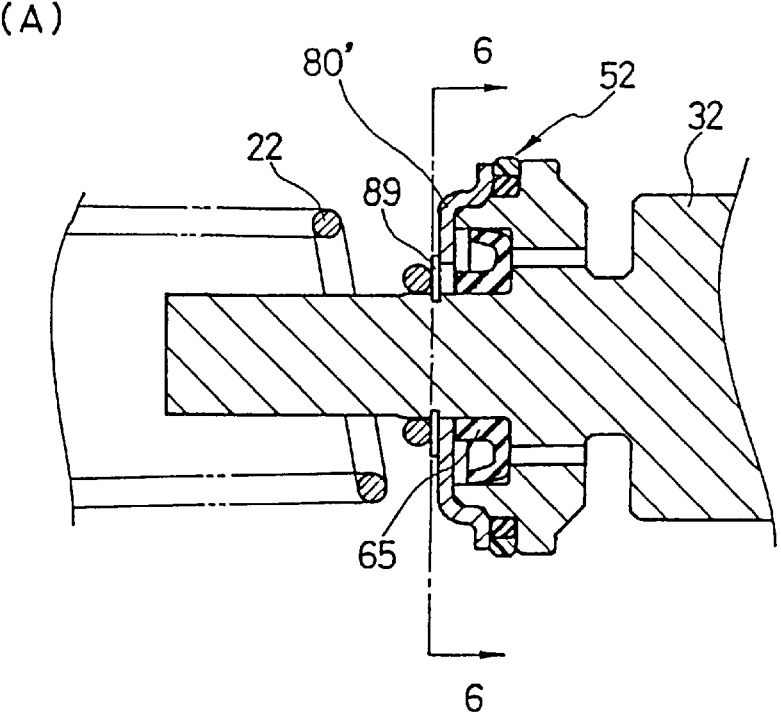
FIGS. 6(A)–6(B) are views showing still another supporting example of a retainer ring.
Figure 6:
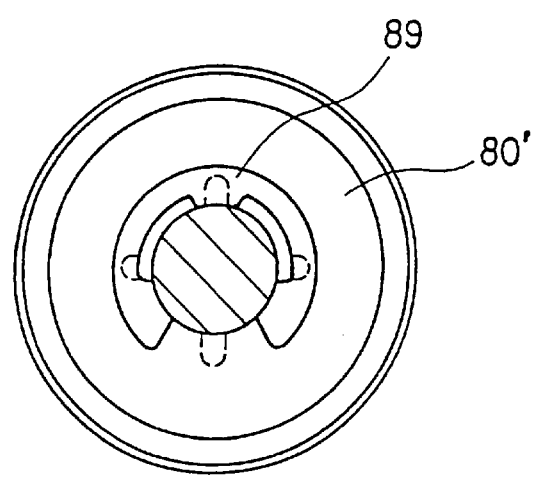
Figure 7A:
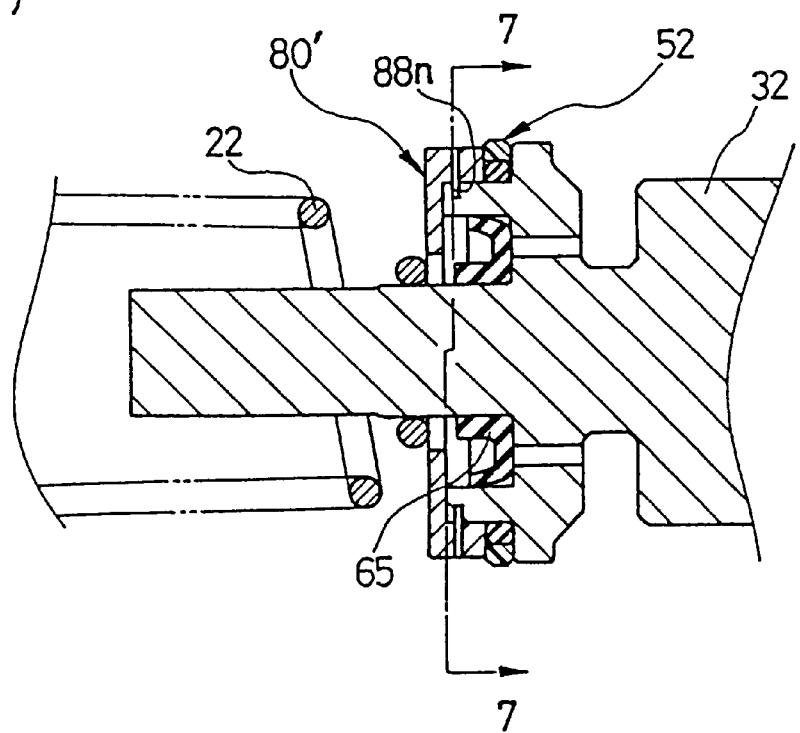
FIGS. 7(A)–7(B) are views similar to FIGS. 6(A)–(B)
Figure 7B:
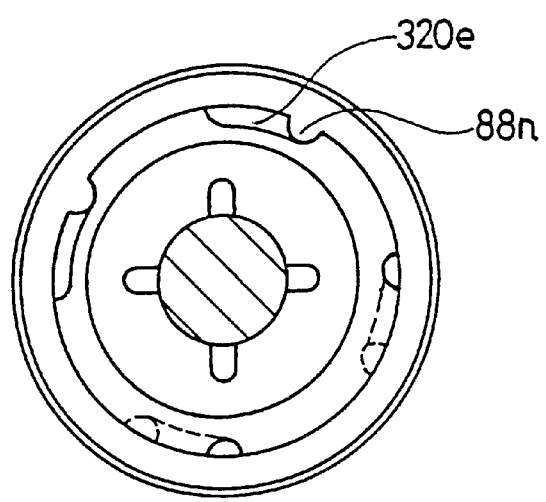

With respect to the support of the retainer ring 80, especially a retainer ring 80' on the secondary side having no support by the bolt member 28, in order to more firmly support, various means can be applied. FIG. 3 through FIGS. 7(A) to 7(B) show such examples. In FIG. 3, a rubber 88r is welded to the inner periphery of the sheet portion 88 of the retainer ring 80', so that the retainer ring 80' supports the secondary piston 32 in a tightening spring fashion. In FIG. 4, a projection 88t is formed on an inner periphery of the sheet portion 88, so that the projection 88t is fitted in a groove or a recess 320d formed in outer periphery of the second land portion 320. FIG. 5 is modification of FIG. 4, in which an upwardly press worked element 88s is used as the projection on the inner periphery of the sheet portion 88. In FIG. 6, a central portion of the retainer ring 80' is supported by an E-ring 89. In FIG. 7, a craw 88n is formed on the inner periphery of the sheet portion 88 and a groove 320e for receiving the craw 88n therein is formed in the outer periphery of a land portion 320 of FIG. 2, so that the retainer ring 80' is fixed to the piston 32 side.

Another Supporting Example of Double Seal Ring

Figure 8:
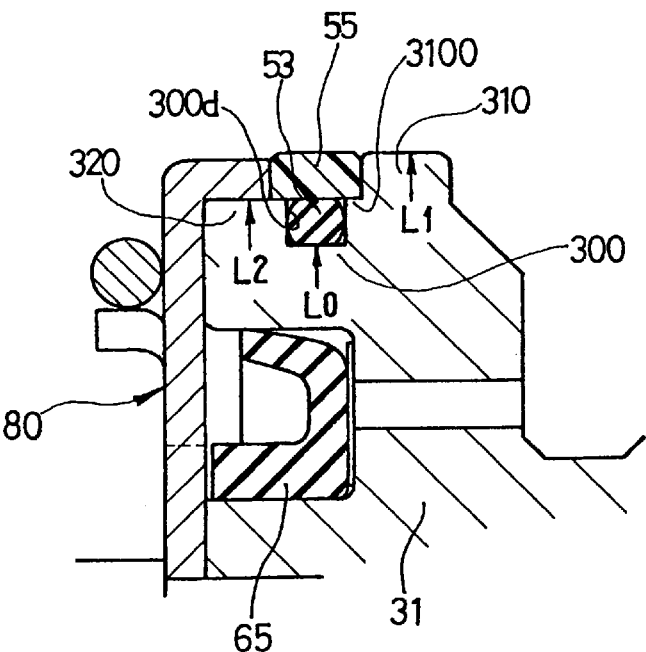
FIG. 8 is a sectional view of a main portion showing another supporting example of a double seal ring.

In FIG. 8, the inner peripheral seal ring comprising an O-ring 53 is fitted in a groove 300d formed in a ring retaining portion 300, and only the outer peripheral seal ring comprising a resin ring 55 is supported by the retainer ring 80. In the example of FIG. 8, not only the diameter L1 of a first land portion 310 but also the diameter L2 of a second land portion 320 are larger than the diameter L0 of the ring retaining portion 300 and the relation of L1>L2 is established. At an area near the ring retaining portion 300, there is a reduced diameter portion 3100 generally equal to the outside diameter L2 of the second land portion 320. The resin ring 55 on the outer periphery side is supported from the inner side of the diameter by both the second land portion 320 and the reduced diameter portion 3100. Here, too, the diameter L2 of the land portion 320 on the piston 31 side is set to be larger than the inside diameter of the inner periphery side O-ring 53 but equal to or smaller than the inside diameter of the outer periphery side resin ring 55. Owing to this arrangement, although the O-ring 53, which is easily elastically deformed and easily returned to its original condition, is likely to expand in diameter, the resin ring 55 is not enlarged in diameter and can, therefore, be attached to the piston 31 in that condition (not enlarged in diameter). In the support form shown in FIG. 8, the outer periphery side resin ring 55 is supported on the portions 320, 3100 while being given a radially outward force by the O-ring 53. Therefore, the outer periphery side resin ring 55 can be supported in a stable manner and the piston 31 can be moved more smoothly.

Another Example of Supplementary Feed Means

Figure 9:
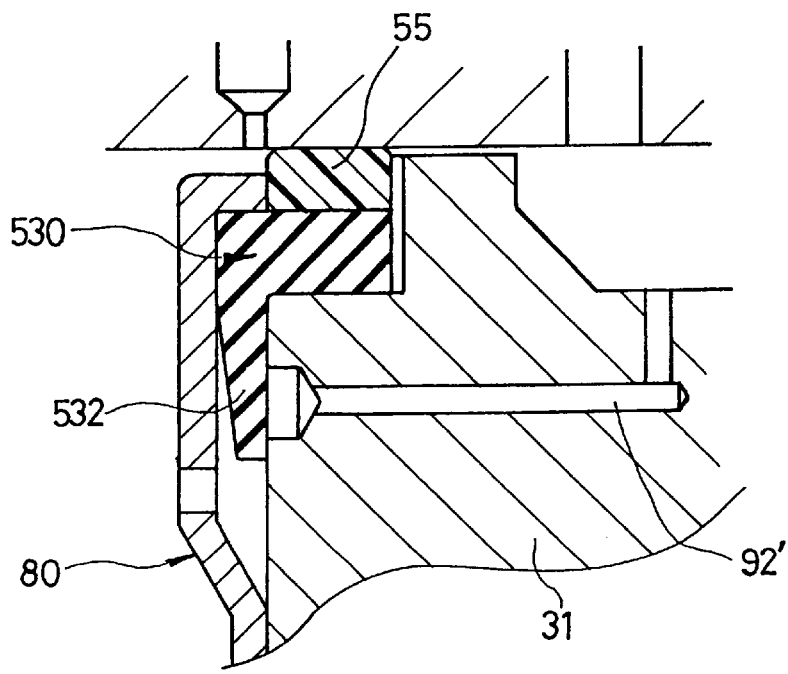
FIG. 9 is a sectional view of a main portion showing another example of supplemental feeding means.

In FIG. 9, a supplementary bore 92' is formed within the piston 31 but an opening portion of the supplementary bore 92' is arranged in the neighborhood of the outer periphery of the piston 31. The opening portion of the supplementary bore 92' is opened and closed by a lip portion 532 which a deformed inner peripheral seal ring 530 includes. That is, it has two functions; one as a supplementary valve to be served as the supplementary feed means and as the inner peripheral seal ring.

One Example as Capacity Reducing Means

Figure 10:
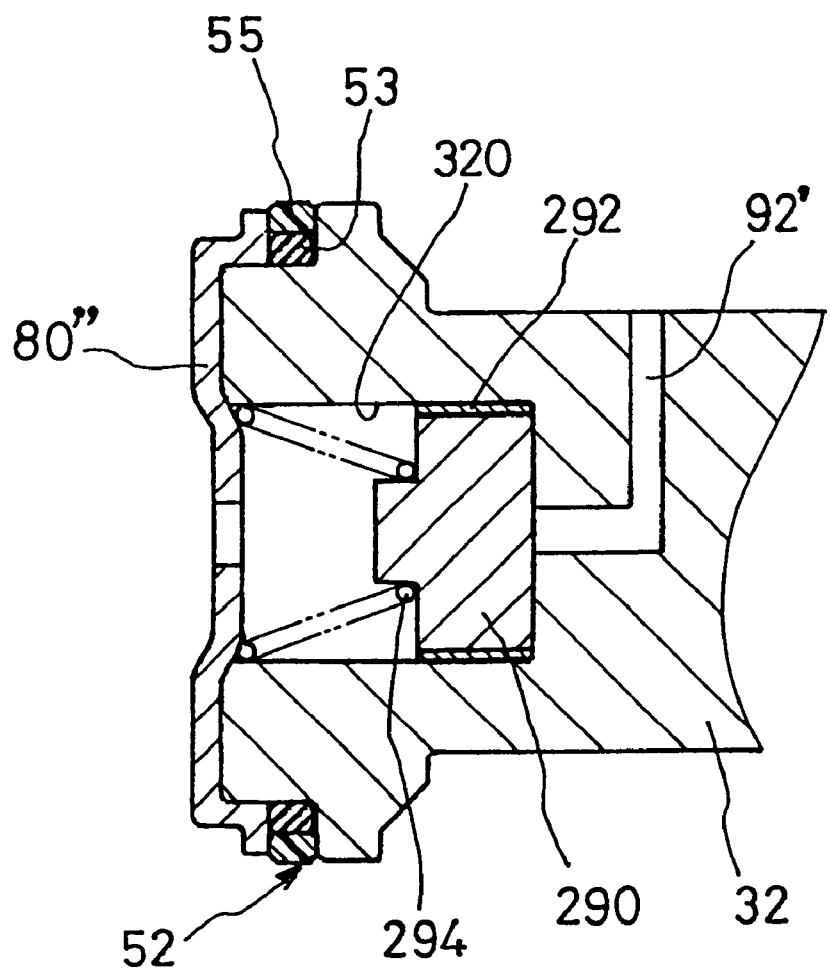
FIG. 10 is a sectional view of a main portion showing one example of capacity reducing means.

FIG. 10 shows one example including a small piston 290 as one means for reducing the capacity. The small piston 290 is located within a recess 320 formed in the center of the piston 32 and axially movable within the recess 320. A sleeve-like member 292 is fitted onto the outer periphery of the small piston 290. Owing to this arrangement, a space formed between the outer periphery of the small piston 290 and the inner periphery of the recess 320 is sealed. The small piston 290 is biased in an opposite direction to the retainer ring 80" by a spring 294 having a small biasing force. In a normal condition, one end of the small piston 290 is in contact with the bottom of the recess 320. The recess 320 is open to the hydraulic pressure chamber 42. A communication path 92' for communicating the recess 320 with the working fluid reservoir 18 is opened to the recess 320. Owing to this arrangement, one end of the small piston 290 is subjected to pressure from the hydraulic pressure chamber 42 and the other end thereof is subjected to pressure from the working fluid reservoir 18. The small piston 290 moves towards the retainer ring 8011 so that when a pressure difference occurs in which the pressure in the hydraulic pressure chamber 42 becomes negative with respect to the reservoir side having atmospheric pressure, the capacity of the hydraulic pressure chamber 42 is reduced while flexing the spring 294.

SECOND EMBODIMENT

Figure 11:
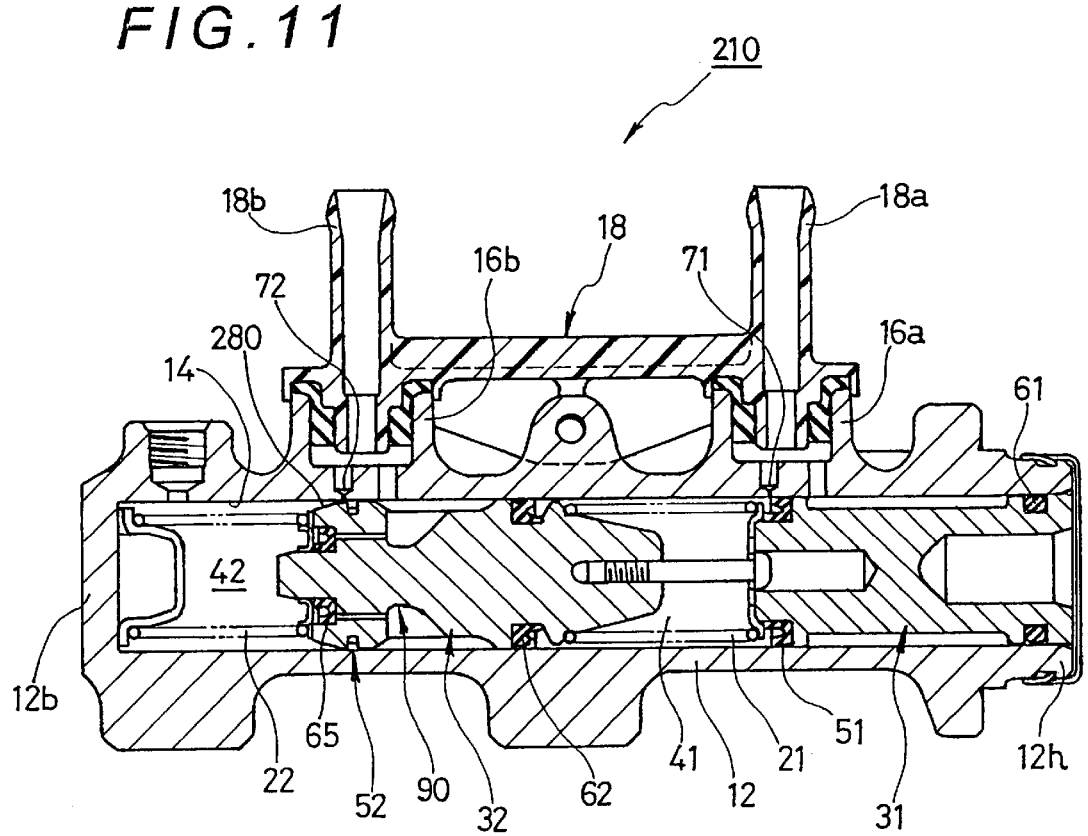
FIG. 11 is a sectional view showing an overall construction of another embodiment of a tandem type master cylinder according to the present invention.
Figure 12:
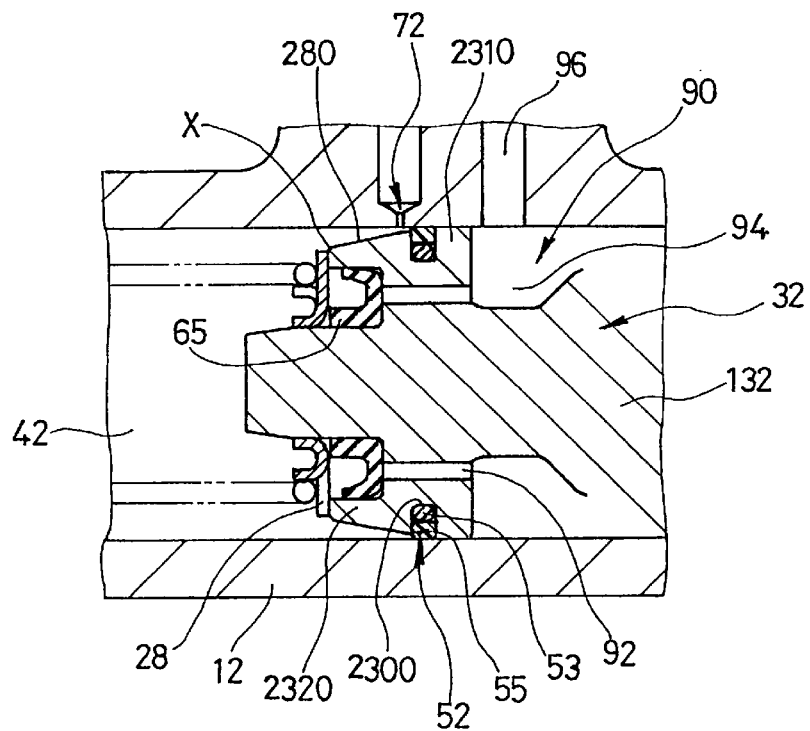
FIG. 12 is an enlarged sectional view showing a main portion of FIG. 11.

FIG. 11 shows an overall sectional construction of another embodiment of a tandem type master cylinder used for a brake, to which the present invention is applied. FIG. 12 is an partly enlarged view showing an end portion, and its nearby area, of a second piston of the master cylinder. Reference numerals representing various component parts are basically the same as those of the first embodiment and mutually corresponding component parts are basically denoted by identical reference numerals, respectively.

A tandem type master cylinder 210 includes a cylinder body 12 having therein a cylinder bore 14 extending axially. On an upper part of the cylinder body 12, there are provided boss portions 16a, 16a communicating with the cylinder bore 14. An integral joint member 18 including joint portions 18a, 18b is supported on the boss portions 16a, 16b. In this example, a working fluid reservoir (not shown) for reserving a working fluid is separately placed from the cylinder body 12, and communicated with the interior of the cylinder body 12 through hoses (not shown) connected respectively to the joint portions 18a, 18b. The cylinder bore 14 within the cylinder body 12 is closed on the cylinder bottom 12b side on the left-hand side of FIG. 11 and opened on the cylinder head 12h side on the right-hand side. The cylinder bore 14 has an inner periphery of a uniform diameter. Within the cylinder bore 14 such designed, there are provided a secondary piston 32, which is located near the cylinder bottom 12b through a return spring 22, another return spring 21, and a primary piston 31 all arranged in order towards the cylinder head 12h.

The primary piston 31 and the secondary piston 32 are provided at two places of outer peripheries thereof with seal rings 51, 61; 52, 62, respectively. Reviewing the pistons 31, 32 individually, the seal rings 51, 61 of the primary piston 31 among the seal rings supported thereon, are cup-type seal rings and O-rings. Similarly, the seal ring 62 of the secondary piston is a cup type seal ring. Those rings are each a single seal ring (not a double seal ring). In contrast, the other seal ring of the secondary piston 32, namely, the seal ring 52 nearest to the cylinder bottom 12b is the double seal ring in question. By those seal rings 51, 61; 52, 62, there are defined a second hydraulic pressure chamber 42 located at an innermost position within the cylinder bore 14, and a first hydraulic pressure chamber 41 located between the pistons 32, 31. In a normal condition where no braking operation is made, the pistons 32, 31 are biased towards the cylinder head 12h by the return springs 22, 21, respectively. Therefore, in the normal condition, the first and second hydraulic pressure chambers 41, 42 are in communication with the interior of an external reservoir, not shown, through relief ports 71, 72 which are formed on the cylinder body 12 side. When an operator actuates the brake, first, the primary piston 31 overcomes the biasing force of the return spring 21, and then, in accordance with the motion on the primary side, the secondary piston 32 overcomes the biasing force of the return spring 22 and moves towards the cylinder bottom 12b side. Then, the cup type seal ring 51 and the double seal ring 52 close the relief ports 71, 72, respectively. The pistons 31, 32 further progresses forwardly to generate hydraulic pressure within the first and second hydraulic pressure chambers 41, 42.

The master cylinder 210 according to the second embodiment of the present invention employs a double sealing as the seal ring 52 for opening and closing the relief port 72 on the secondary side. The double sealing comprises an O-ring 53 located on the inner periphery side of the maser cylinder 210, and a resin ring 55 located on the outer periphery side. As already mentioned, the double seal ring has, on the hand one, such an advantage that the seal is less damaged but, on the other hand, such a disadvantage that a requirement for a supplemental feed of fluid must be met. Here, the secondary piston 32 are provided on an end face portion of the piston body 132 with a cup type seal ring 65, so that working fluid can be fed from the working fluid reservoir side to the second hydraulic pressure chamber 42. The piston body 132, and its periphery, of the secondary piston 32 are provided respectively with a communication path 90 for communicating the hydraulic pressure chamber 42 with the interior of the joint portion 18, in addition to a provision of the groove formed in the end face. One opening portion of the communication path 90 is sealed by the cup type seal ring 65. Therefore, when negative pressure is generated within the hydraulic pressure chamber 42 by abrupt braking operation or anti-skid controlling, a pressure difference occurs at a front and rear area of a lip of the cup type seal ring 65 as in the cup type seal ring 51 of the primary piston 31. Due to the effect of this pressure difference, the lip is caused to fall or collapse, so that working fluid is fed from the working fluid reservoir side to the hydraulic pressure chamber 42 through the joint portion 18b and the communication path 90. The communication path 90 includes a space 94 at the side periphery of the piston body 132, and a supplementary bore 96 formed in the cylinder body 12 in addition to the relief port 92 formed in the piston body 132 of the secondary piston 32. The cap type seal ring 65 as the supplementary valve is prevented from coming off by the retainer ring 28 serving also as a spring retainer of the return spring 22.

In the second embodiment of the present invention, there is one feature in the respect that the piston body 132 itself is provided with a prescribed tapered portion 280 in order to enhance the assembling performance of the double seal ring 52 which the secondary piston 32 includes. As better seen from FIG. 12 showing the secondary side on a partly enlarged scale, in the master cylinder 210, although an outer configuration of the first land 2310 adjacent to an attachment groove 2300 in which the double seal ring 52 can be fitted is in parallel with the axis of the piston body 132, the configuration of the outer periphery of the other second land portion 2320 near the end face of the piston body 132 is a tapered portion which is gradually enlarged in outside diameter from an insert end portion X serving as an insert port when the seal ring is fitted towards the attachment groove 2300. Moreover, the tapered portion 230 on the second land portion 2320 side is the greatest in outside diameter at its portion nearer to the attachment groove 2300. This greatest diameter is, however, slightly smaller than the outside diameter of the first land portion 2310. In view of a relation to the inside diameter of the resin ring 55 as the outer peripheral seal ring, the outside diameter of the attachment groove 2300 is smaller than the inside diameter of the resin ring 55, and the outside diameter of the first land portion 2310 is larger than the inside diameter of the resin ring 55. In contrast, reviewing the tapered portion 280 of the second land portion 2310, the outside diameter at the insert end portion X is smaller than the inside diameter of the resin ring 55, while the outside diameter of a portion proximate to the attachment groove 2300 is larger than the inside diameter of the resin ring 55. Therefore, the tapered portion 280 from the insert end portion X to the attachment groove 2300 can effectively used as a tool for assisting a smooth attachment of not only the inner peripheral seal ring comprising the O-ring 53 but also of the outer peripheral seal ring comprising the resin ring 55 to the attachment groove 2300. For this reason, a special tool other than the piston body 132 is not required. The double seal ring can easily be assembled by it. Especially, if the outside diameter of the tapered portion 280 of the second land portion 2320 at an area proximate to the attachment groove 2300 is set to be smaller than the outside diameter of the first land portion 2310, the resin ring 55 can more easily be assembled. Moreover, it can reduce the flowing resistance at an area in the vicinity of the opening portion of the relief port 72 on the cylinder body 12 side, so that fluid is more smoothly returned from the hydraulic pressure chamber 42 to the reservoir side. In other words, the tapered portion 280 as a whole assists an easy assembly of the seal ring. Moreover, the second land portion 2320 exhibits such a merit or advantage (merit resulting from eliminating the throttling function) that a part of the tapered portion 280 proximate to the attachment groove 2300 assists not only an easy assembly but also a smooth flow of the fluid returning to the working fluid reservoir.

Another Example of Tapered Portion

Figure 13:
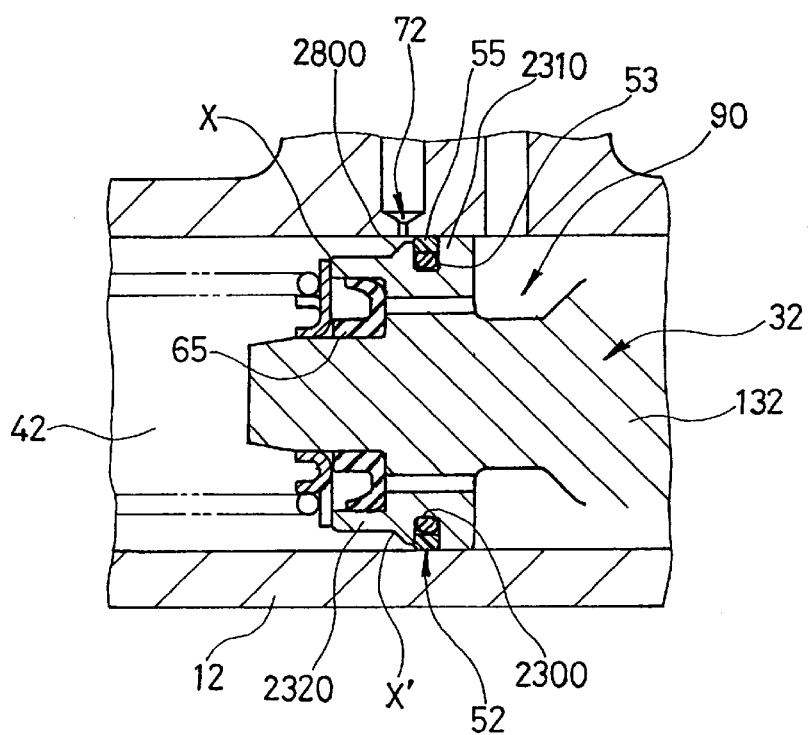
FIG. 13 is an enlarged sectional view showing another example of a tapered portion.

FIG. 13 shows one example in which an area of the second land portion 2320 from the insert end portion X to the attachment groove 2300 is partly tapered. Reviewing the second land portion 2320 on the insert end portion X side with reference to FIG. 13, the second land portion 2320 is smaller in outside diameter than the first land portion 2310 from the insert end portion X to a location X' on a midway from the insert end portion X to the attachment groove 2300. However, the configuration of the outer periphery of the tapered portion is in parallel to the axis of the piston body 132 as in the first land portion 2310. The area or portion from the midway location X' of the second land 2320 to the attachment groove 2300, namely, the area or portion of the second land portion 2320 near the attachment groove 2300 is partly tapered 2800. This tapered portion 2800 is gradually enlarged in outside diameter from the insert end portion X side (or midway location X') towards the attachment groove 2300 as in the afore-mentioned tapered portion 280. The tapered portion 2800 is located at an area facing with the opening of the relief port 72 on the cylinder body 12 side so that a gap path between the inner wall of the cylinder body 12 and the second land portion 2320 is increased. By this, the flowing resistance between the relief port 72 and the second hydraulic pressure chamber 42 is reduced, so that the return of fluid from the second hydraulic pressure chamber 42 to the working oil reservoir is made smoothly. In this another example, since the outside diameter of the insert end portion X is also set to be smaller than the inside diameter of the resin ring 55 as the outer peripheral seal ring, the second land portion 2320 including the tapered portion 2800 functions as a tool for attaching the seal ring.

Figure 14:
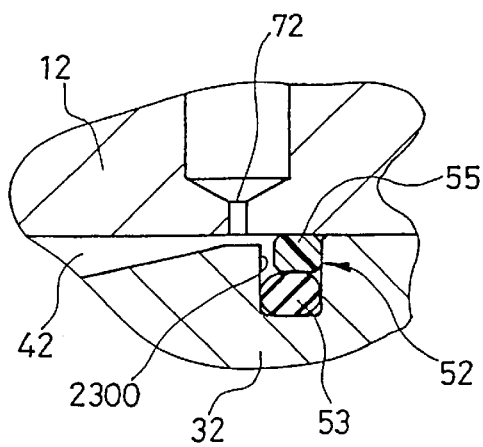
FIGS. 14(A) and 14(B) are enlarged sectional views of a main portion showing a behavior of a double seal ring.
Figure 14:
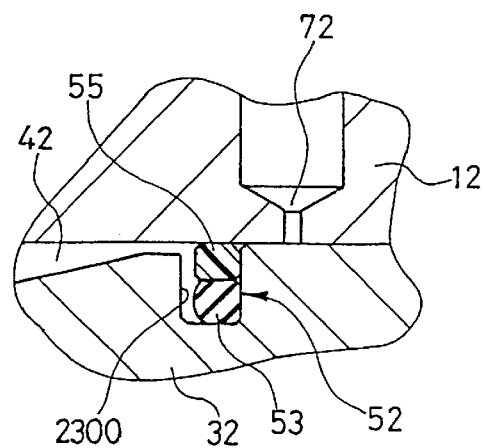

During the course of study with respect to the behavior of the double seal ring or mechanism of the seal, we sometimes encounter with a phenomenon that the seal ring of the outer periphery is slanted to temporarily increase the sliding resistance. This phenomenon will be made clear with reference to FIGS. 14(A)–14(B) and 15. FIGS. 14(A)–14(B) are partly sectional views showing the states of the double seal ring 52 on the outer periphery of the piston 32, FIG. 14(A) shows when the double seal ring 52 is attached, and FIG. 14(B) shows the double seal ring 52 being subjected to hydraulic pressure. The piston 32 is provided in its outer periphery with an attachment groove 2300. An O-ring 53 is attached to a bottom portion, namely, inner periphery side, of the attachment groove 2300, and a resin ring 55 is attached to the outer periphery side of the attachment groove 2300. The -ring 53 as the inner peripheral seal ring is circular in sectional configuration before attachment but changed to be oblong in section after attachment. In FIG. 14(A), the hydraulic chamber 42 within the cylinder body 12 is opened to the working fluid reservoir side through the relief port 72. As shown in FIG. 14(A), when attached the piston 32, the O-ring 53 becomes oblong in sectional configuration, and the width dimension of the O-ring 53 is slightly larger than that of the resin ring 55. In FIG. 14(B), the O-ring 53 and the resin ring 55 are almost the same in width dimension. FIG. 14(B) shows one state of the double seal ring 52 in which the double seal ring 52 as the seal portion extends exceeding the other end of the relief port 72 to block the communication between the hydraulic pressure chamber 42 and the working fluid reservoir through the relief port 72. For this reason, the hydraulic pressure in the hydraulic pressure chamber 42 is raised and the double seal ring 52 is subjected to the effect of the hydraulic pressure from the hydraulic pressure chamber 42. As a result, the O-ring 53, which is easily elastically deformed, is pushed away from the hydraulic pressure chamber 42 by the hydraulic pressure to thereby reduce the width of the ring. As a result, the outer peripheral resin ring 55 is urged with an increased force by the O-ring 53. However, according to observation, the outer peripheral resin ring 55 is slanted clockwise or tends to fall by the force from the O-ring 53.

Figure 15:
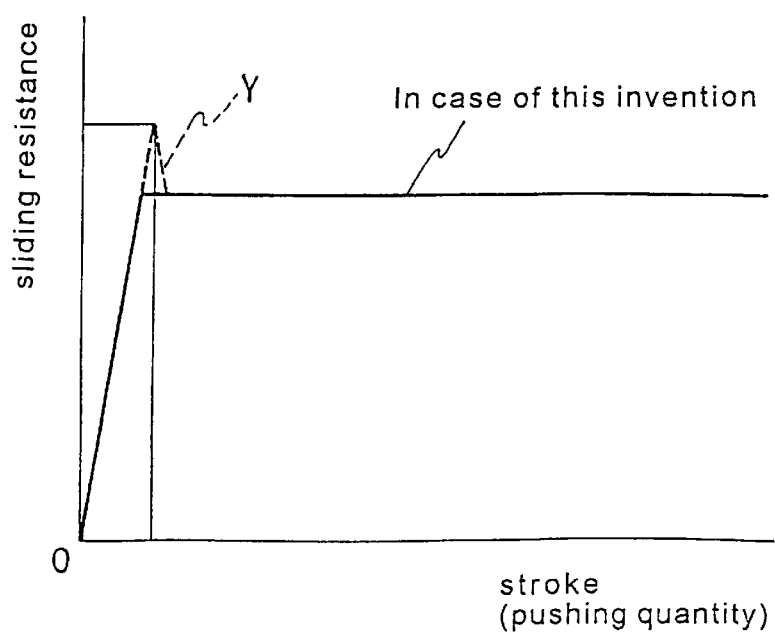
FIG. 15 is a graph showing a relation between stroke and sliding resistance.

FIG. 15 is a graph showing a relation between stroke and sliding resistance, in which stroke (namely, pushing quantity) of the piston 32 is plotted along the abscissa and sliding resistance acting on the piston 32 is plotted along the ordinate. As shown by a broken line in FIG. 15, there is a portion Y where the sliding resistance is temporarily increased on an initial stage of the pushing operation. This portion Y occurs due to slanting of the resin ring 55 and affects adversely to the smooth movement of the piston 32 or the double seal ring 52. Such increase of sliding resistance (or interruption) results in temporary delay of rising of the hydraulic pressure on the initial stage of operation or perception of disorder against the operation. If the resin ring 55 as the outer seal ring is slanted in the first stage of the pushing operation and if the piston 32 is returned in that slated condition, the piston 32 is not sufficiently returned and a fear occurs that the hydraulic pressure cannot be released sufficiently.

The inner peripheral seal ring 53 is an O-ring made from either elastic molecular elastomer based on ethylene propylene terpolymer, or ethylene propylene rubber. Those materials each have an anti-oil property against a non-petroleum brake oil for automobiles and a heat resisting property which can stand for such a high temperature as more than 120° C. On the other hand, the outer peripheral seal ring 55 is made from ethylene tetra-fluoride resin and harder than the inner peripheral seal ring 53. A Shore hardness of the outer peripheral seal ring 55 is Hs 80 to Hs 90. The configurations of the inner and outer peripheral seal rings 53, 55 are known per se. The inner peripheral seal ring 53 as the O-ring is circular in sectional configuration before it is attached to the attachment groove 2300 as previously mentioned. However, once attached or fitted in the attachment groove 2300, it exhibits an oblong configuration in section. When the hydraulic pressure in the hydraulic chamber 42 is raised, it width is relatively reduced. The O-ring 53 used here is Hs 55 to Hs 65 in Shore hardness, and preferably Hs 60. This O-ring 53 is rather less hard compared with the conventional O-ring having Shore hardness of Hs 65 to Hs 75. By decreasing the hardness, the O-ring 53 is more easily attached to the attachment groove 2300. Moreover, by doing so, the outer peripheral seal ring 55 is not slanted on the initial stage of operation. Through experiments, it was confirmed that the portion Y (see the broken line), where the sliding resistance is temporarily increased, is eliminated.

Figure 16A:
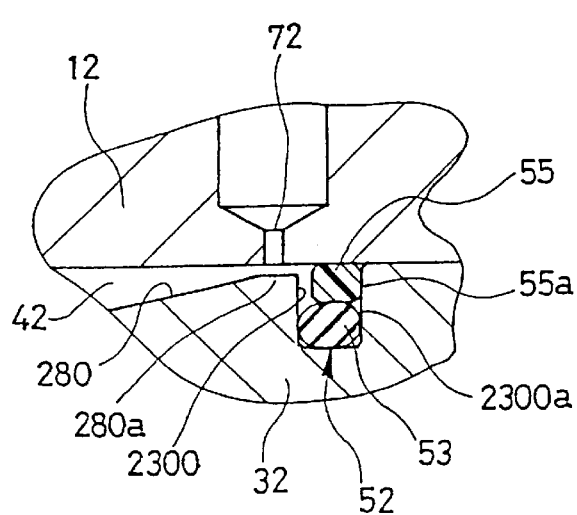
FIGS. 16(A)–16(B) are enlarged sectional views showing slant preventive means of a resin ring.
Figure 16B:
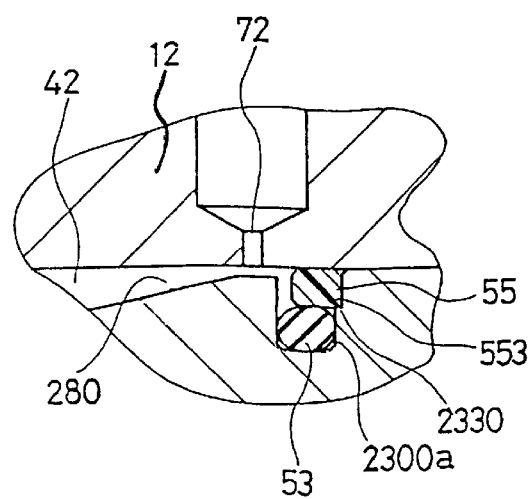

As a method for eliminating the portion Y where the sliding resistance is temporarily increased, as shown in FIG. 16(A), the side surface 2300a (side surface on the side away from the hydraulic pressure chamber 42) of the attachment groove 2300 and the side surface 55a of the outer peripheral seal ring 55 contacting this side surface may be more roughly finished, for example, approximately 100 μm, than usual, or as shown in FIG. 16(B), the side surface 2300a away from the hydraulic pressure chamber 42 may be provided with a stepped portion 2330. Those methods shown in FIGS. 16(A)–16(B) employ a support means against the force for causing the outer peripheral seal ring 55 to be slanted. The Shore hardness itself of the O-ring 53 as the inner peripheral seal ring may be Hs 55 to Hs 65 or Hs 65 to Hs 75. The stepped portion 2330 is provided in such a manner as to be perpendicular (namely, parallel to the axes of the cylinder bore 14 and the cylinder body 12) to the side surface 2300a of the attachment groove 2300. Also, it is preferred that by means of not chamfering an angular portion 553 of the bottom portion of the outer peripheral seal ring 55 to be placed on the stepped portion, or by reducing the chamfering quantity, the slanting is more reliably prevented.

Although the inner wall of the cylinder bore 14 of the cylinder body 12 made of aluminum alloy is subjected to anodic oxide treatment and the outer peripheral seal ring 55 is made of material having a small frictional resistance, it is preferred that the insufficient return of the primary and secondary pistons 31, 32, especially, the secondary piston 32, is reliably prevented by making the sliding resistance caused by the seal rings of the primary and secondary pistons 31, 32 even. To this end, it is preferred that the pushing force of the cup type seal ring 51 on the primary side against the cylinder body 12 is set to be smaller than the pushing force of the seal ring 52 on the secondary side against the cylinder body 12. For example, it is preferred that the tightening width on the primary side comprising the cup type seal ring 51 is set to 0.6 mm to 1.0 mm, while the tightening width on the secondary side comprising the double seal ring is set to 0.1 mm to 0.35 mm.

The piston 32 includes a conic tapered portion 280 between the end face facing with the hydraulic pressure chamber 42 and the attachment groove 2300. The tapered portion 280 is gradually enlarged in diameter form the end face towards the attachment groove 2300. Its portion 280a adjacent to the attachment groove 2300 is a land in parallel with the axes of the cylinder bore 14 and the cylinder body 12 (see FIGS. 16(A)–16(B)).

What is claimed is:

1. A master cylinder including a cylinder body having therein a cylinder bore extending along an axial direction thereof, a piston slidably inserted into said cylinder bore formed in said cylinder bore and for defining a hydraulic pressure chamber within said cylinder bore together with said cylinder body, a return spring for axially biasing said piston in an opposite direction to said hydraulic pressure chamber, a relief port formed in a side periphery of said cylinder body and one end of which is faced directly with said hydraulic pressure chamber, and a double seal ring to be fitted in an outer periphery of said piston and for blocking said relief port in response to a stroke of said piston towards said hydraulic pressure chamber, said double seal ring including an inner peripheral seal ring made of elastic material, and an outer peripheral seal ring made of harder material than said inner peripheral seal ring and located on an outer periphery of said inner seal ring, wherein said piston includes a ring retaining portion having an outside diameter L0 and for retaining a double seal ring, a first land portion adjacent to said ring retaining portion and having an outside diameter L1 (where L1>L0), and a second land portion adjacent to an opposite side of said ring retaining portion to said first land portion and having an outside diameter L2 (where L2<L1), the outside diameter L2 of said second land portion being equal to or smaller than an inside diameter of said outer peripheral seal ring, one side surface of said outer peripheral seal ring on the side of said second land portion being supported by a retainer ring retained by said piston.

2. A master cylinder of claim 1, wherein said piston includes a communication path for communicating said working fluid reservoir with said hydraulic pressure chamber, and a supplementary valve for feeding a supplementary working fluid from said working fluid reservoir through said communication path.

3. A master cylinder of claim 1, wherein said piston supports a small piston one end of which is subjected to pressure from said hydraulic pressure chamber and the other end of which is subjected to pressure from said working fluid reservoir, and when a pressure difference occurs in which pressure of said hydraulic pressure chamber becomes negative with respect to a working fluid reservoir having atmospheric pressure, said small piston moves to reduce the capacity of said hydraulic pressure chamber.

4. A master cylinder of claim 1, wherein said inner and outer peripheral seal rings are supported at the other side surfaces on the side of said first land portion by a side wall of said first land portion.

5. A master cylinder of claim 1, wherein the outside diameter L2 of said second land portion is equal to the outside diameter L0 of said ring retaining portion, and said retainer ring supports the side surface of said inner peripheral seal ring on the side of said second land portion together with said outer peripheral seal ring.

6. A master cylinder of claim 1, wherein a relation of L2>L0 is established, and the side surface of said inner peripheral seal ring on the side of said second land portion is supported by a side wall of said second land portion.

7. A master cylinder of claim 1, wherein a material of said inner peripheral seal ring is elastic molecular elastomer based on ethylene propylene terpolymer, or ethylene propylene rubber, and a material of said outer peripheral seal ring is ethylene tetra-fluoride resin.

8. A master cylinder of claim 1, wherein a Shore hardness of said inner peripheral seal ring is Hs 55 to 65 and a Shore hardness of said outer peripheral seal ring is Hs 80 to Hs 90.

9. A master cylinder of claim 8, wherein a material of said cylinder body is aluminum alloy, and a seal sliding surface of said cylinder bore, on which said double seal ring can slide, is coated with an anodic oxide film.

10. A master cylinder including a cylinder body having therein a cylinder bore extending along an axial direction thereof, a piston slidably inserted into said cylinder bore formed in said cylinder bore and for defining a hydraulic pressure chamber within said cylinder bore together with said cylinder body, a return spring for axially biasing said piston in an opposite direction to said hydraulic pressure chamber, a relief port formed in a side periphery of said cylinder body and one end of which is faced directly with said hydraulic pressure chamber and the other end of which is faced with a working fluid reservoir, and a double seal ring to be fitted in an outer periphery of said piston and for blocking said relief port in response to a stroke of said piston towards said hydraulic pressure chamber, said double seal ring including an inner peripheral seal ring made of elastic material, and an outer peripheral seal ring made of harder material than said inner peripheral seal ring and located on an outer periphery of said inner seal ring, wherein said piston includes a piston body having an insert end portion facing with said hydraulic pressure chamber and serving as an insert inlet port when said double seal ring is assembled, an attachment groove located away from said insert end portion of said piston body in a direction opposite to said hydraulic pressure chamber, and into which said double seal ring is fitted, a first land portion adjacent to said attachment groove and located opposite to said insert end portion with respect to said attachment groove, and a second land portion adjacent oppositely to said first land portion with respect to said attachment groove, and located on the same side as said insert end portion, said master cylinder satisfying the following conditions A and B;

A. The outside diameter of said insert end portion of said piston body is smaller than the inside diameter of said outer peripheral seal ring, and the outside diameters of said first and second land portions adjacent to said attachment groove are larger than the inside diameter of said outer peripheral seal ring.

B. Between said insert end portion and said attachment groove of said piston body, there is provided a tapered portion which is gradually increased in outside diameter from said insert end portion to said attachment groove.

11. A master cylinder of claim 10, wherein said piston includes a communication path for communicating said working fluid reservoir with said hydraulic pressure chamber, and a supplementary valve for feeding a supplementary working fluid from said working fluid reservoir through said communication path.

12. A master cylinder of claim 10, wherein said piston supports a small piston one end of which is subjected to pressure from said hydraulic pressure chamber and the other end of which is subjected to pressure from said working fluid reservoir, and when a pressure difference occurs in which pressure of said hydraulic pressure chamber becomes negative with respect to a working fluid reservoir having atmospheric pressure, said small piston moves to reduce the capacity of said hydraulic pressure chamber.

13. A master cylinder of claim 10, wherein the outside diameter of said second land portion located on the same side as said insert end portion is smaller than the outside diameter of said first land portion.

14. A master cylinder of claim 10, wherein said tapered portion extends over the entire length from said insert end portion to said attachment groove.

15. A master cylinder of claim 10, wherein said tapered portion is located at least at a portion facing with an opening of said relief port on the side of said cylinder body, so that flowing resistance of a working fluid between said hydraulic pressure chamber and said relief port can be reduced.

16. A master cylinder of claim 10, wherein a material of said inner peripheral seal ring is elastic molecular elastomer based on ethylene propylene terpolymer, or ethylene propylene rubber, and a material of said outer peripheral seal ring is ethylene tetra-fluoride resin.

17. A master cylinder of claim 10, wherein a Shore hardness of said inner peripheral seal ring is Hs 55 to 65 and a Shore hardness of said outer peripheral seal ring is Hs 80 to Hs 90.

18. A master cylinder of claim 16, wherein a material of said cylinder body is aluminum alloy, and a seal sliding surface of said cylinder bore, on which said double seal ring can slide, is coated with an anodic oxide film.

19. A tandem type master cylinder including a cylinder body having therein a cylinder bore extending in an axial direction from a head side towards a bottom side, a primary piston located within said cylinder bore formed in said cylinder body on said head side, and a secondary piston located within said cylinder bore formed in said cylinder body on said bottom side, said pistons holding at a front and a rear portion thereof a front and a rear seal ring, respectively, said pistons defining a first hydraulic pressure chamber between said primary piston and said secondary piston, a second hydraulic pressure chamber between said front seal ring of said secondary piston and the bottom side of said cylinder body, and fluid supplementary chambers formed in side surfaces of said primary and secondary pistons between said front seal ring and said rear seal ring, respectively, said fluid supplementary chambers being in communication with a working fluid reservoir through a supplementary bore extending through a wall surface of said cylinder body, wherein said front seal ring of said secondary piston is a double seal ring including an inner peripheral seal ring made of elastic material, and an outer peripheral seal ring made of harder material than said inner peripheral seal ring and located on the outer periphery of said inner peripheral sealing, said tandem type master cylinder having, in order to support said double seal ring, the following feature;

Said secondary piston includes a ring retaining portion having an outside diameter L0 and for retaining said double seal ring, a first land portion adjacent to said ring retaining portion and having an outside diameter L1 (where L1>L0), and a second land portion adjacent to an opposite side of said ring retaining portion to said first land portion and having an outside diameter L2 (where L2<L1), the outside diameter L2 of said second land portion being equal to or smaller than an inside diameter of said outer peripheral seal ring, one side surface of said outer peripheral seal ring on the side of said second land portion being supported by a retainer ring retained by said piston.

20. A tandem type master cylinder of claim 19, wherein said front seal ring of said primary piston is a cup type seal ring, and a pushing force applied to an inner wall of said cylinder body by said cup type seal ring is small compared with a pushing force applied to the inner wall of said cylinder body by said double seal ring.

21. A tandem type master cylinder including a cylinder body having therein a cylinder bore extending in an axial direction from a head side towards a bottom side, a primary piston located within said cylinder bore formed in said cylinder body on said head side, and a secondary piston located within said cylinder bore formed in said cylinder body on said bottom side, said pistons holding at a front and a rear portion thereof a front and a rear seal ring, respectively, said pistons defining a first hydraulic pressure chamber between said primary piston and said secondary piston, a second hydraulic pressure chamber between said front seal ring of said secondary piston and the bottom side of said cylinder body, and fluid supplementary chambers formed in side surfaces of said primary and secondary pistons between said front seal ring and said rear seal ring, respectively, said fluid supplementary chambers being in communication with a working fluid reservoir through a supplementary bore extending through a wall surface of said cylinder body, wherein said front seal ring of said secondary piston is a double seal ring including an inner peripheral seal ring made of elastic material, and an outer peripheral seal ring made of harder material than said inner peripheral seal ring and located on the outer periphery of said inner peripheral sealing, said piston including a piston body having an insert end portion facing with said hydraulic pressure chamber and serving as an insert inlet port when said double seal ring is assembled, an attachment groove located away from said insert end portion of said piston body in a direction opposite to said hydraulic pressure chamber, and into which said double seal ring is fitted, a first land portion adjacent to said attachment groove and located opposite to said insert end portion with respect to said attachment groove, and a second land portion adjacent oppositely to said first land portion with respect to said attachment groove, and located on the same side as said insert end portion, tandem type master cylinder further satisfying the following conditions A and B;

A. The outside diameter of said insert end portion of said piston body is smaller than the inside diameter of said outer peripheral seal ring, and the outside diameters of said first and second land portions adjacent to said attachment groove are larger than the inside diameter of said outer peripheral seal ring.

B. Between said insert end portion and said attachment groove of said piston body, there is provided a tapered portion which is gradually increased in outside diameter from said insert end portion to said attachment groove.

22. A tandem type master cylinder of claim 21, wherein said front seal ring of said primary piston is a cup type seal ring, and a pushing force applied to an inner wall of said cylinder body by said cup type seal ring is small compared with a pushing force applied to the inner wall of said cylinder body by said double seal ring.

* * * * *